(12) United States Patent
Ito et al.

(10) Patent No.: US 6,504,316 B2
(45) Date of Patent: Jan. 7, 2003

(54) DISCHARGE LAMP LIGHTING CIRCUIT

(75) Inventors: Masayasu Ito, Shizuoka (JP); Hitoshi Takeda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/796,291

(22) Filed: Feb. 28, 2001

(65) Prior Publication Data
US 2001/0020827 A1 Sep. 13, 2001

(30) Foreign Application Priority Data
Mar. 9, 2000 (JP) ........................................ 2000-064577

(51) Int. Cl.$^7$ ............................................. H05B 37/02
(52) U.S. Cl. ................................... 315/224; 315/209 R
(58) Field of Search ................................. 315/307, 308, 315/224, 291, 219, 209 R, 225

(56) References Cited

U.S. PATENT DOCUMENTS

| | | | |
|---|---|---|---|
| 5,463,287 A | * 10/1995 | Kurihara et al. ............ | 315/291 |
| 5,486,740 A | 1/1996 | Yamashita et al. .......... | 315/308 |
| 5,705,898 A | 1/1998 | Yamashita et al. .......... | 315/308 |
| 6,002,215 A | * 12/1999 | Yamashita et al. .......... | 315/306 |

\* cited by examiner

Primary Examiner—Don Wong
Assistant Examiner—Wilson Lee
(74) Attorney, Agent, or Firm—Fish & Richardson P.C.

(57) ABSTRACT

A discharge lamp lighting circuit 1 has a DC power supply circuit 3 for outputting a DC voltage and a DC-AC conversion circuit 4 for converting the output voltage of the DC power supply circuit 3 into an AC voltage and then supplying the AC voltage to a discharge lamp 6. To light the discharge lamp 6, a predetermined period of time over which the polarity of the voltage supplied from the DC-AC conversion circuit 4 to the discharge lamp 6 is defined as either positive or negative and is provided before the discharge lamp 6 is lighted. The voltage polarity is forcibly inverted to limit the duration of the period so as not to exceed the predetermined time. The circuit reduces costs and prevents short life and degradation of a discharge lamp by placing a time limit on the duration of the period over which the supply voltage polarity is temporarily fixed before the discharge lamp is lighted.

7 Claims, 12 Drawing Sheets

DISCHARGE LAMP LIGHTING CIRCUIT

BACKGROUND OF THE INVENTION

This invention relates to an art for reducing costs and preventing degradation of a discharge lamp in a discharge lamp lighting circuit adapted to stabilize start performance by control of temporarily fixing the supply voltage polarity to the discharge lamp for voltage supply control before the discharge lamp is lighted.

The configuration of a lighting circuit of a discharge lamp, such as a metal halide lamp, comprising a DC power supply circuit, a DC-AC conversion circuit, and a starter circuit is known. For example, in the configuration wherein a DC—DC converter is used as a DC power supply circuit and a full-bridge type circuit comprising two pairs of semiconductor switch elements for performing switching control and a driver circuit thereof are used for a DC-AC conversion circuit, the positive-polarity (or negative-polarity) voltage output by the DC—DC converter is converted into rectangular-wave voltage in the full-bridge type circuit, then this voltage is supplied to a discharge lamp.

In order to well light a discharge lamp, a technique of supplying a temporary high voltage (open-circuit voltage or open voltage) to the discharge lamp before the discharge lamp is lighted is known. At this time, preferably the supply voltage polarity to the discharge lamp is temporarily fixed; however, the period of fixing the supply voltage polarity is prolonged in the situation where the discharge lamp does not immediately make the transition to a light state if a high voltage signal (so-called starter pulse) generated by a starter circuit is applied to the discharge lamp. Thus, for example, if a bootstrap system is adopted for driving the semiconductor switch elements making up a DC-AC conversion circuit, the capacitance of a capacitor must be preset to a large value because of the requirement for providing the amount of charges accumulated in the capacitor from a power source (this is a problem), causing an increase in costs.

In order to light another discharge lamp with one discharge lamp already lighted in a lighting circuit wherein lighting control related to a plurality of discharge lamps can be performed by a common circuit, if that discharge lamp does not make the transition to a light state, the discharge lamp already lighted is kept in the state in which the supply voltage polarity remains fixed over a long time. Thus a short life, degradation, and the like is caused by placing a thermal stress on the electrode of the discharge lamp, which is a problem.

SUMMARY OF THE INVENTION

The present invention reduces costs and prevents short life and degradation of a discharge lamp by placing a time limit on the duration of the period over which the supply voltage polarity is temporarily fixed by voltage supply control before the discharge lamp is lighted.

According to the invention, there is provided a discharge lamp lighting circuit comprising a DC power supply circuit for outputting a DC voltage and a DC-AC conversion circuit for converting the output voltage of the DC power supply circuit into an AC voltage and then supplying the AC voltage to a discharge lamp. In order to light the discharge lamp, the period of time over which the polarity of the voltage supplied from the DC-AC conversion circuit to the discharge lamp is defined as either positive or negative is provided before the discharge lamp is lighted. A polarity inversion means for inverting the polarity of the voltage if the duration of the period exceeds a predetermined time is provided for alternating the polarity of the voltage supplied to the discharge lamp after the discharge lamp is lighted.

Therefore, according to the invention, the polarity inversion means forcibly inverts the voltage polarity so that the time of fixing the polarity of the voltage supplied to the discharge lamp to one polarity before the discharge lamp is lighted does not continue more than necessary.

DETAILED DESCRIPTION

Figure 1:
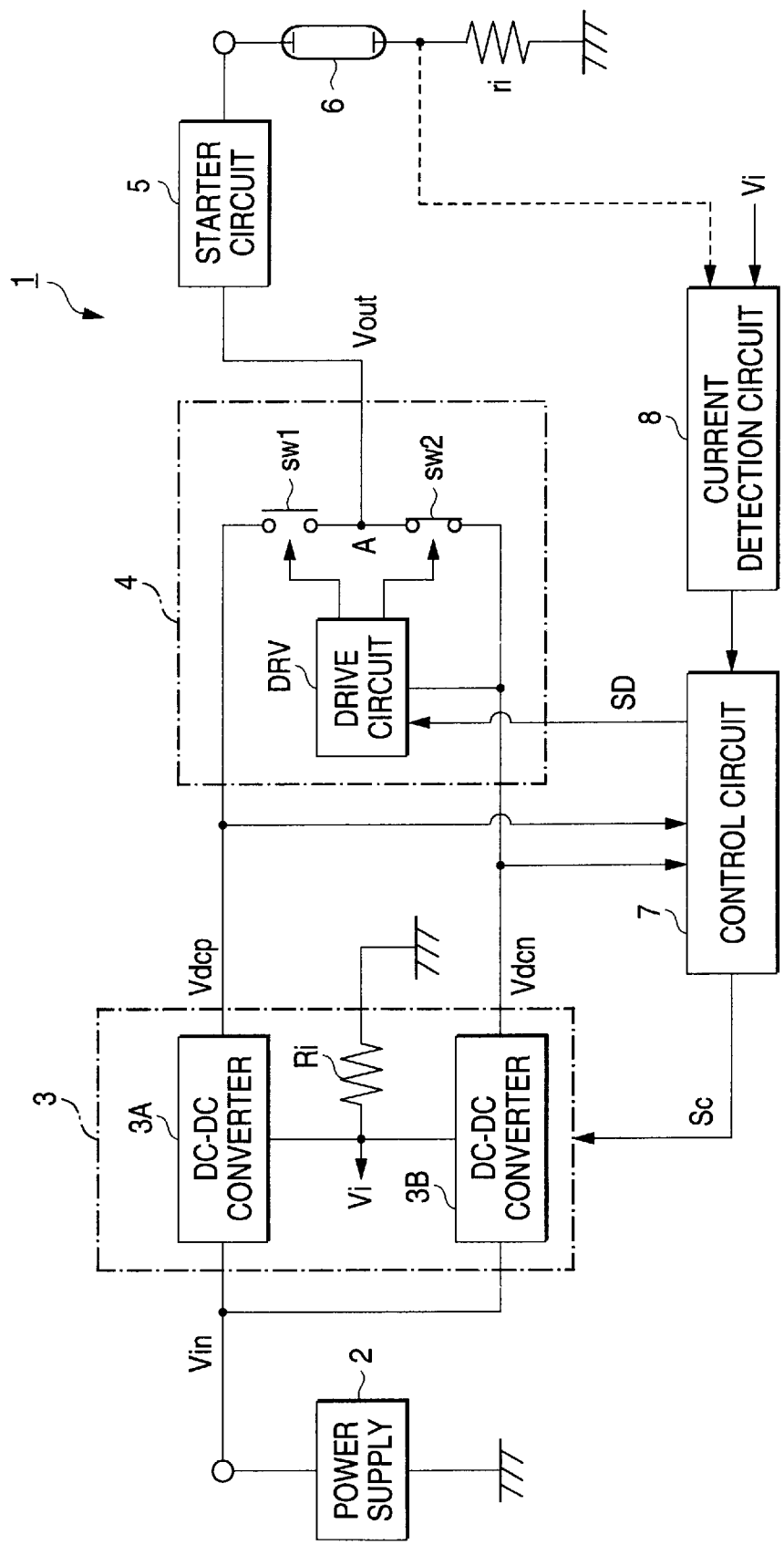
FIG. 1 is a circuit block diagram showing the basic configuration of a discharge lamp lighting circuit according to the invention.

FIG. 1 shows the basic configuration of a discharge lamp lighting circuit according to the invention; it shows the circuit configuration concerning one discharge lamp.

A discharge lamp lighting circuit 1 comprises a power supply 2, a DC power supply circuit 3, a DC-AC conversion circuit 4, and a starter circuit 5.

The DC power supply circuit 3 receives DC input voltage (Vin) from the power supply 2 and outputs any desired DC voltage. The output voltage is variable-controlled in response to a control signal from a control circuit 7. The DC power supply circuit 3 uses DC—DC converters each having the configuration of a switching regulator (chopper type, flyback type, and the like); for example, a configuration can be named wherein a first circuit part (DC—DC converter 3A) for providing positive-polarity voltage output (positive voltage output) and a second circuit part (DC—DC converter 3B) for providing negative-polarity voltage output (negative voltage output) are placed in parallel with each other.

Figure 2:
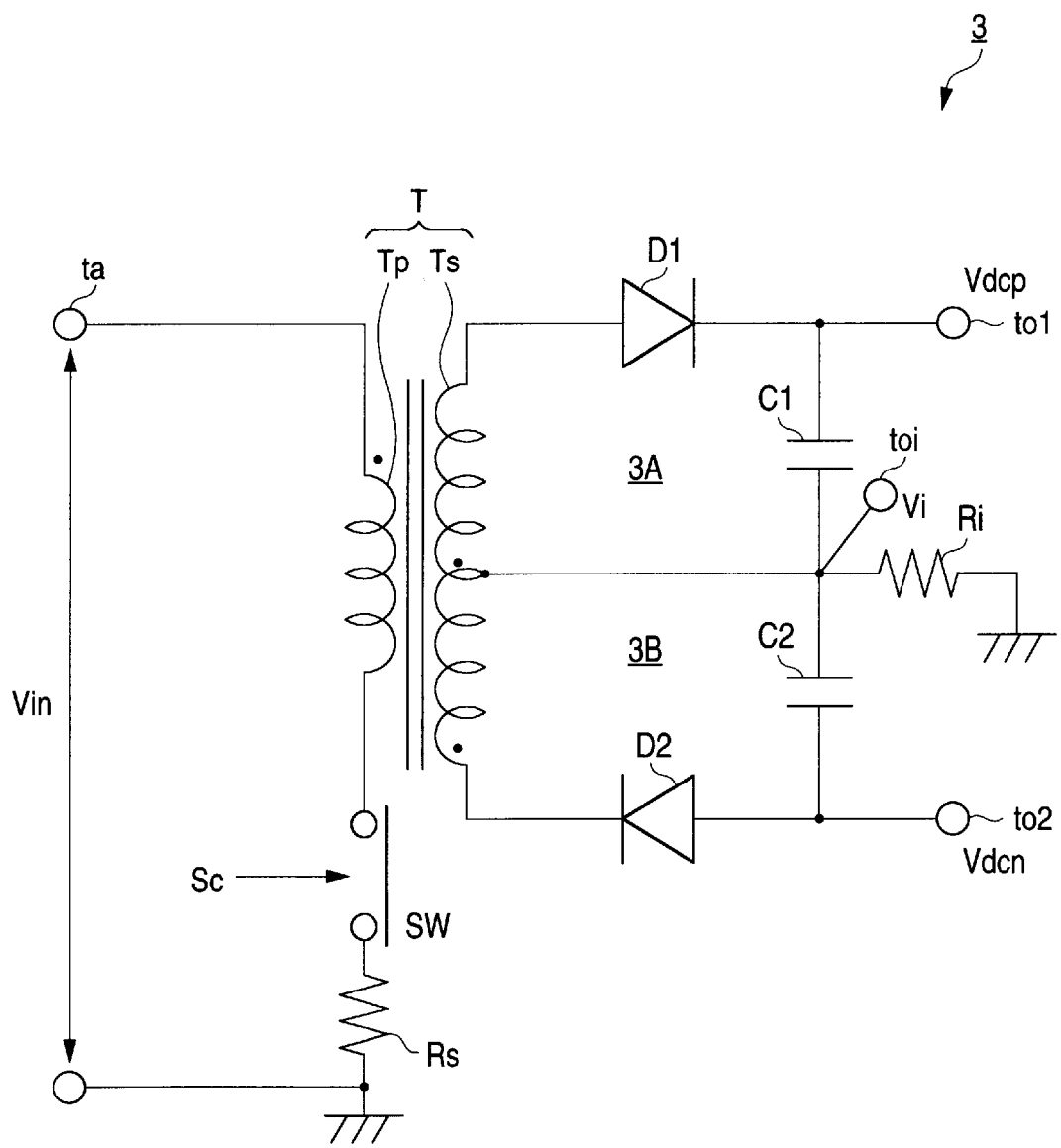
FIG. 2 is a circuit diagram showing a configuration example of a DC power supply circuit.
Figure 3:
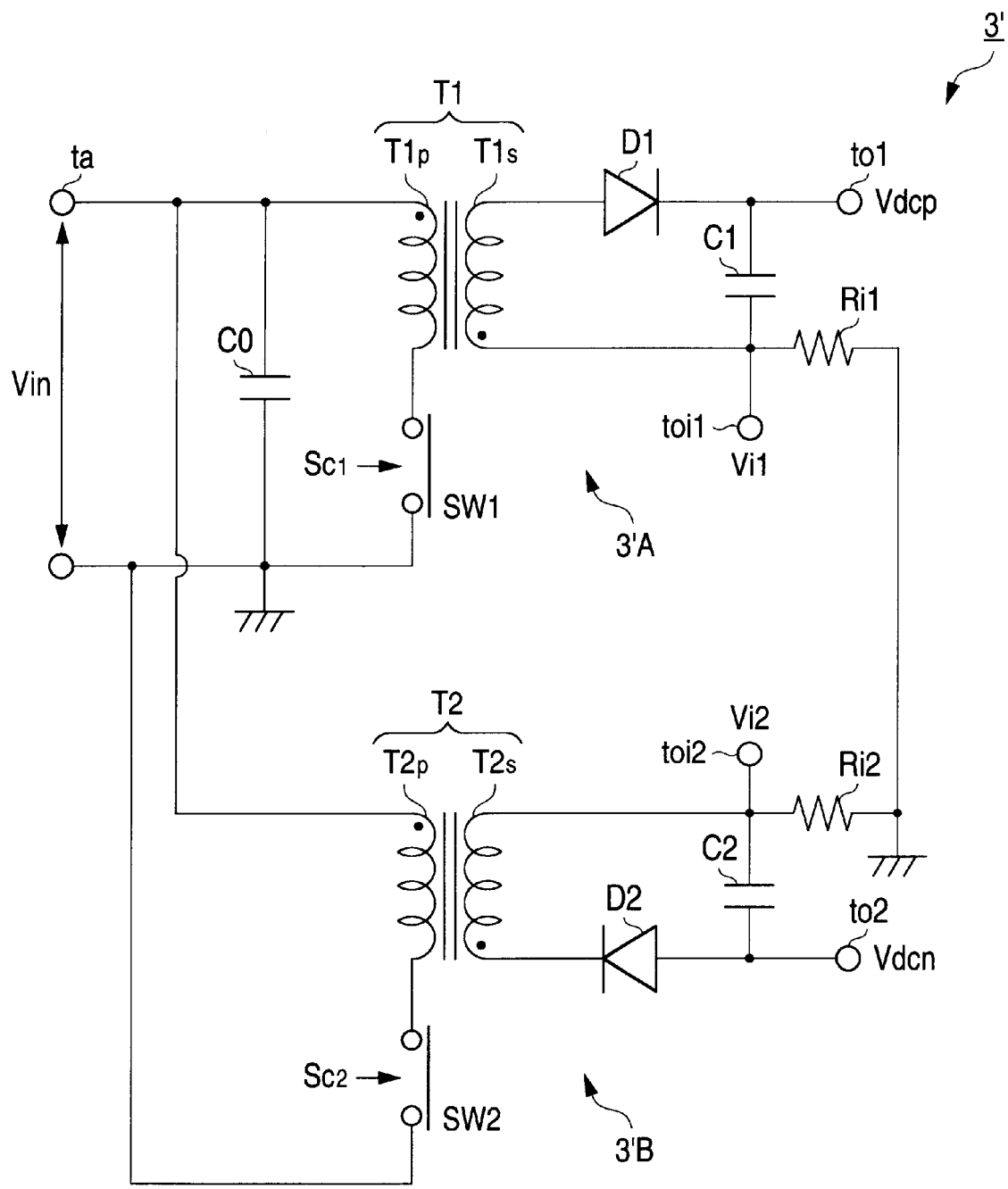
FIG. 3 is a circuit diagram showing another configuration example of a DC power supply circuit.

FIGS. 2 and 3 show configuration examples of the DC power supply circuit 3.

In the example shown in FIG. 2, a primary winding Tp of a transformer T is connected at one end to a DC input terminal ta, whereby the voltage Vin is input. The primary winding Tp is grounded at an opposite end via a semiconductor switch element SW (simply indicated by a switch symbol in the figure but a FET (field-effect transistor) and the like may be used) and a current detection resistor Rs, which is arbitrary and need not necessarily be provided. A signal Sc from the control circuit 7 is supplied to a control terminal of the semiconductor switch element SW (a gate if the switch element SW is an FET) for performing switching control of the semiconductor switch element SW.

A secondary winding Ts of the transformer T is connected at one end to an anode of a diode D1, and the cathode of the diode D1 is connected to one end of a capacitor C1 and is also connected to a terminal to1 from which output voltage (Vdcp) is provided. The opposite end of the capacitor C1 is connected to an intermediate tap of the secondary winding Ts and is grounded via a resistor Ri.

The secondary winding Ts is connected at an opposite end to a cathode of a diode D2, and the anode of the diode D2 is connected to a capacitor C2 and a terminal to2. Output voltage (Vdcn) is provided through the terminal to2.

The resistor Ri is a current detection element for providing a detection signal concerning an electric current flowing into a discharge lamp 6, and voltage conversion of the current flowing into the resistor Ri is performed, thereby executing current detection. A detection terminal toi is connected to the connection point of the resistor Ri and the capacitors C1 and C2 and a detection signal Vi is provided from the detection terminal toi.

As described above, the DC power supply circuit 3 outputs the positive-polarity voltage Vdcp and the negative-polarity voltage Vdcn separately from the two output terminals to1 and to2.

The "." mark added to each winding of the transformer T denotes the beginning of the winding; for example, the "." mark appears at the connection end to the diode D2 and at the winding start end at an intermediate tap.

Another implementation of a DC power supply circuit 3' shown in FIG. 3 comprises two transformers T1 (primary winding T1p and secondary winding T1s) and T2 (primary winding T2p and secondary winding T2s).

The primary windings T1p and T2p of the transformers are connected at one terminal to a DC input terminal ta and are grounded at an opposite end via switch elements SW1 and SW2 (simply indicated by switch symbols in the figure, although field-effect transistors may be used). The switch elements SW1 and SW2 are controlled separately to turn on and off by control signals Sc1 and Sc2 from the control circuit (7), whereby each secondary output can be variably-controlled independently.

A capacitor C0 placed in parallel with the primary windings T1p and T2p is connected at one end to the DC input terminal ta and is grounded at an opposite end.

The DC—DC converter 3'A contains the transformer T1, the switch element SW1, and a rectification diode D1, a smoothing capacitor C1, and a current detection resistor Ri1 connected to the secondary winding T1s. That is, the secondary winding T1s is connected at one end to an anode of the diode D1 and a cathode of the diode D1 is connected to an output terminal to1 and one end of the capacitor C1. The capacitor C1 is connected at an opposite end to a winding start end terminal of the secondary winding T1s and is grounded via the current detection resistor Ri1.

Thus, in the circuit section, the current flowing into the primary winding T1p of the transformer T1 is controlled by turning the switch element SW1 on and off based on the control signal Sc1, and a positive-polarity voltage Vdcp is provided at the output terminal to1 through the diode D1 and the capacitor C1 from the secondary winding T1s. A terminal toi1 is a current detection terminal connected to the connection point of the capacitor C1 and the current detection resistor Ri1 and a detection signal Vi1 is provided from the terminal toi1.

The DC—DC converter 3'B contains the transformer T2, the switch element SW2, a rectification diode D2, a smoothing capacitor C2, and a current detection resistor Ri2 connected to the secondary winding T2s. That is, the secondary winding T2s is connected at one end (winding start end terminal) to a cathode of the diode D2 and the anode of the diode D2 is connected to an output terminal to2 and one end of the capacitor C2. The capacitor C2 is connected at an opposite end to a winding termination end terminal of the secondary winding T2s and is grounded via the current detection resistor Ri2.

Thus, in this circuit section, the current flowing into the primary winding T2p of the transformer T2 is controlled by turning the switch element SW2 on and off based on the control signal Sc2, and a negative-polarity voltage Vdcn is provided at the output terminal to2 through the secondary winding T2s, the diode D2, and the capacitor C2. A terminal toi2 is a current detection terminal connected to the connection point of the capacitor C2 and the current detection resistor Ri2 and a detection signal Vi2 is provided from the terminal toi2.

The DC power supply circuit according to the invention is not limited to that capable of providing both positive-polarity and negative-polarity outputs as described above, and may be a DC power supply circuit capable of providing single-polarity output voltage. For example, a configuration having only the DC—DC converter 3A (or 3A') capable of providing positive-polarity voltage output, or a configuration having only the DC—DC converter 3B (or 3B') capable of providing negative-polarity voltage output, could be used.

The DC-AC conversion circuit 4 placed at the stage following the DC power supply circuit 3 (see FIG. 1) converts the output voltage of the DC power supply circuit 3 into AC voltage and then supplies the AC voltage to a discharge lamp 6. The positive-polarity voltage and the negative-polarity voltage are sent separately from the two output terminals of the DC power supply circuit 3 to the DC-AC conversion circuit 4. To switch the output voltage Vdcp of the DC—DC converter 3A and the output voltage Vdcn of the DC—DC converter 3B, a pair of semiconductor switch elements sw1 and sw2 (simply indicated by switch symbols in the figure, although field-effect transistors or the like may be used as the switch elements) provided in the DC-AC conversion circuit 4 are operated alternately by a drive circuit DRV, and the AC voltage generated by the alternation operation is supplied to the discharge lamp 6.

That is, one of the two switch elements sw1 and sw2 connected in series at the output stage of the DC power supply circuit 3, sw1, is connected to the output terminal of the DC—DC converter 3A and also to the output terminal of the DC—DC converter 3B via sw2. For example, an IC (integrated circuit) known as a half-bridge driver may be used as the drive circuit DRV for performing reciprocating switching control of the switch elements. That is, the half bridge alternating operation may be performed so that when the element sw1 is on, the element sw2 is turned off, and that when the element sw1 is off, the element sw2 is turned on based on signals supplied to the control terminals of the switch elements from the drive circuit DRV, whereby the DC voltage is converted into an AC voltage.

Figure 4:
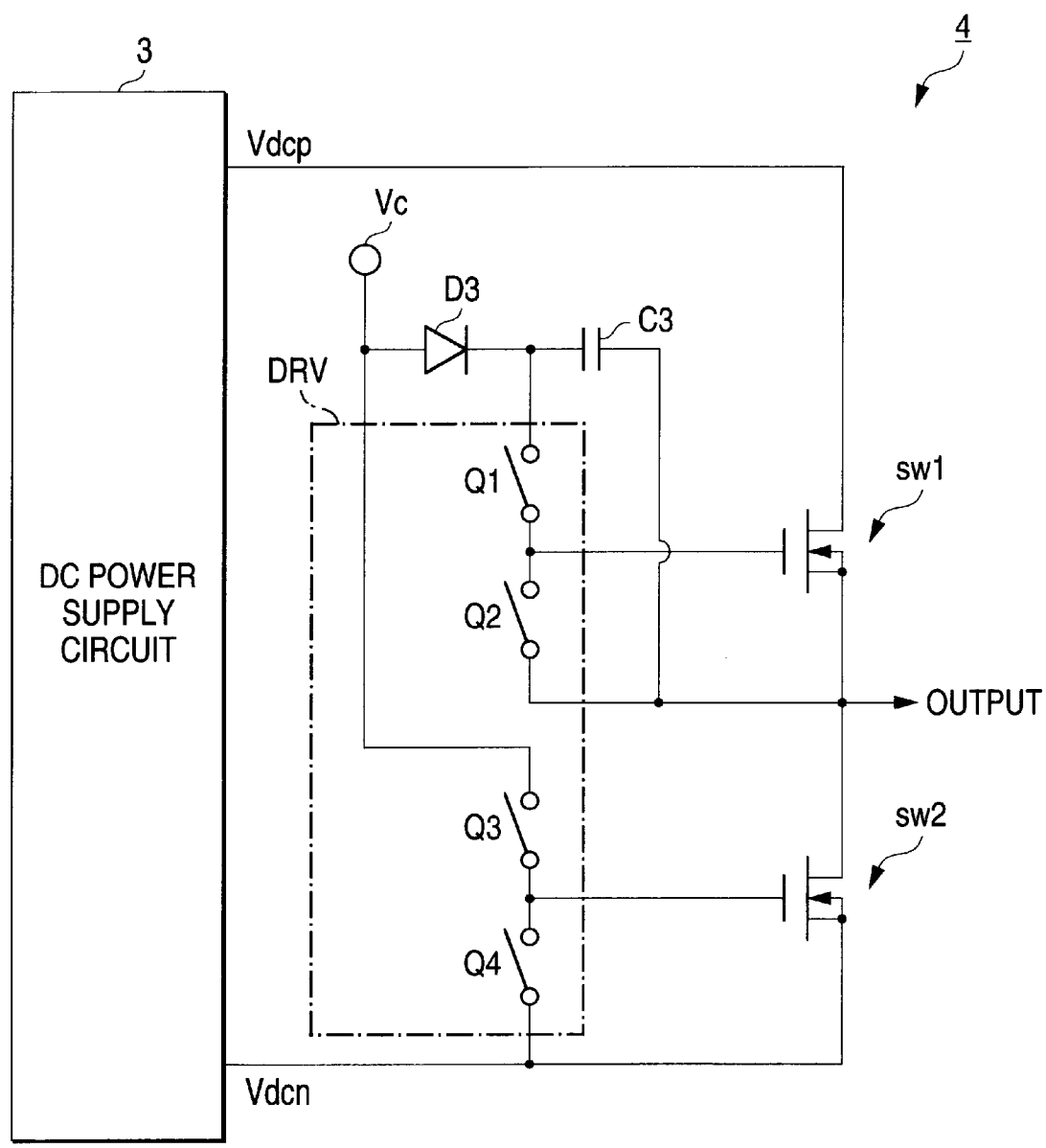
FIG. 4 is a drawing describing the configuration of a boot strap type drive circuit.

FIG. 4 shows a configuration example of a bootstrap type drive circuit when field effect transistors are used as the elements sw1 and sw2.

A series circuit of two elements Q1 and Q2 and a series circuit of two elements Q3 and Q4 are provided as switching elements in a drive IC are indicated by switch symbols equivalently in FIG. 4.

Power is supplied to the elements Q1 to Q4 from a power supply terminal Vc. In particular, power is supplied to the elements Q1 and Q2 via a diode D3 from the power supply terminal Vc, and power is supplied to the elements Q3 and Q4 directly from the power supply terminal Vc. That is, a cathode of the diode D3 is connected via a capacitor C3 to the connection point of n-channel FET sw1 and sw2 and is also connected to the element Q1. The connection point between the elements Q1 and Q2 is connected to a gate of the FET sw1, and the terminal of the element Q2 that is opposite to the connection point to the element Q1 is connected to the connection point between the FET's sw1 and sw2.

The element Q3 is connected at one end to the power supply terminal Vc and the connection point between the elements Q3 and Q4 is connected to a gate of the FET sw2. The terminal of the element Q4 that is opposite to the connection point to the element Q3 is connected to a source of the FET sw2.

The elements Q1 to Q4 are controlled by a control signal supplied to the DRV IC from the control circuit 7.

In the drive circuit, for example, to turn on the FET sw1 positioned above the FET sw2 in the figure, it is necessary to charge the capacitor C3 via the diode D3 from the power supply terminal Vc and use the charges to turn on the FET sw1 (the element Q1 is turned on and the element Q2 is turned off. At this time, to turn off the FET sw2 below the FET sw1 in the figure, the element Q3 may be turned off and the element Q4 may be turned on).

The starter circuit 5 (see FIG. 1) is provided for generating a starting high-voltage signal (start pulse) at the beginning of lighting the discharge lamp 6. The start signal is superimposed on AC voltage Vout output by the DC-AC conversion circuit 4 and is applied to the discharge lamp 6. That is, the starter circuit 5 contains an inductive load (the inductance component of a secondary winding, or the like, of a trigger transformer) and the discharge lamp 6 is connected at one electrode terminal to a connection point A of the switch elements sw1 and sw2 via the inductive load, and connected at the other electrode terminal directly to ground (GND) or via a current detection resistor ri (if the current detection resistor shown in FIGS. 2 or 3 is not provided) to ground (GND).

In addition to a current detection circuit 8 (see FIG. 1) for detecting an electric current flowing into the discharge lamp by using the current detection resistor Ri or ri, a voltage detection circuit for detecting the tube voltage of the discharge lamp or its equivalent voltage can be utilized as a detection circuit for detecting voltage or current related to the discharge lamp 6. As an example of the latter, voltage detection means (for example, a circuit for detecting output voltage using a partial pressure resister, or the like) is placed immediately following each of the DC—DC converters 3A and 3B forming the DC power supply circuit 3, and a detection signal of output voltage (Vdcp, Vdcn) detected by the means can be used as an alternative signal to a voltage detection signal related to the discharge lamp 6.

Figure 5:
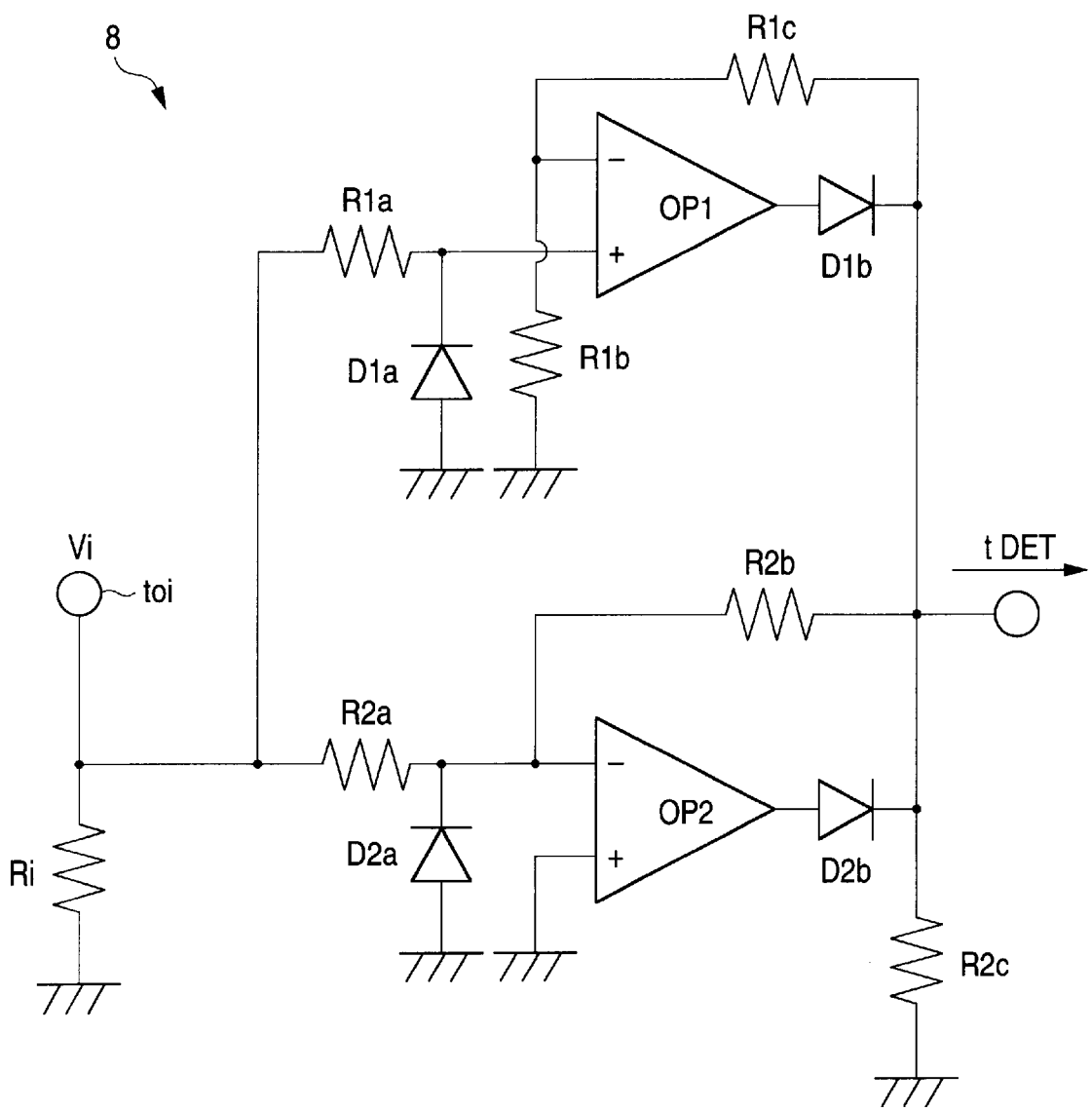
FIG. 5 is a circuit diagram showing a configuration example of a current detection circuit.

FIG. 5 shows an implementation of the current detection circuit 8, wherein a non-inverting amplification circuit and an inverting amplification circuit are placed in parallel to use the voltage drop caused by the current detection resistor Ri. The output voltage of the non-inverting amplification circuit or the inverting amplification circuit is selectively output.

In FIG. 5, an operational amplifier OP1 implements the non-inverting amplification circuit and has a non-inverting input terminal connected via a resistor R1a to the above-mentioned detection terminal toi (the connection point of the current detection resistor Ri and the smoothing capacitors C1 and C2). A diode D1a has a cathode connected to the non-inverting input terminal of the operational amplifier OP1 and the anode is grounded. The diode D1a and a diode D2a (described later) is added for the purpose of protecting the operational amplifier when the input voltage to the operational amplifier is inverted to a negative value.

The operational amplifier OP1 has an output terminal connected to an anode of a diode D1b and the cathode of the diode D1b is connected to a current detection output terminal tDET, and is grounded via resistor R2c. The non-inverting input terminal of the operational amplifier OP1 is grounded-via a resistor R1b and is connected to the cathode of the diode D1b via a resistor R1c. The resistance values of the resistors R1a, R1b, and R1c are set to the same value.

An operational amplifier OP2 implements the inverting amplification circuit, and has an inverting input terminal connected to the detection terminal toi via a resistor R2a. A diode D2a has a cathode connected to the inverting input terminal of the operational amplifier OP2 and the anode is grounded.

The operational amplifier OP2 has an output terminal connected to an anode of a diode D2b and the cathode of the diode D2b is connected to the current detection output terminal tDET and is grounded via a resistor R2c. The inverting input terminal of the operational amplifier OP2 is connected to the cathode of the diode D2b via a resistor R2b (the resistance value of the resistor R2b is set to twice that of the resistor R2a). A non-inverting input terminal of the operational amplifier OP2 is grounded.

In the circuit, the voltage drop component caused by the current detection resistor Ri is amplified to twice the voltage by the non-inverting amplification circuit of the operational amplifier OP1; alternately, it is amplified to "−2" X voltage by the inverting amplification circuit of the operational amplifier OP2. Either of the voltages, whichever is higher, is selected by the diodes D1b and D2b connected to the output terminals of the operational amplifiers, and is output to the current detection output terminal tDET. That is, when the supply voltage to the discharge lamp 6 has negative polarity, the output voltage of the non-inverting amplification circuit of the operational amplifier OP1 is provided at the current detection output terminal tDET, and when the supply voltage to the discharge lamp 6 has positive polarity, the output voltage of the inverting amplification circuit of the operational amplifier OP2 is provided at the current detection terminal tDET. The detection voltage thus provided may be used as a signal to determine whether or not the discharge lamp 6 is lighted, a signal to determine the light state of the discharge lamp 6 and define supply power, or the like.

The control circuit 7 (see FIG. 1) controls voltage, current, or supply power of the discharge lamp 6 in response to the state detection signal of the discharge lamp 6, which detection signal is generated by the current detection circuit 8. The control circuit sends a control signal (Sc) to the DC power supply circuit 3, thereby controlling the output voltage, or sends a control signal (SD) to the drive circuit DRV for controlling polarity switching of the bridge. The control circuit 7 also performs output control to reliably light the discharge lamp 6 by raising the supply voltage to the discharge lamp 6 to one level before the discharge lamp 6 is lighted.

Before the discharge lamp is lighted, the on/off state of each of the switch elements sw1 and sw2 is defined by the control signal sent from the control circuit 7 to the drive circuit DRV. In addition, the polarity of voltage supplied from the DC-AC conversion circuit 4 to the discharge lamp 6 before the discharge lamp is lighted is defined as either positive or negative. The control circuit 7 contains polarity inversion means for determining whether or not the duration of the period over which the polarity of the voltage supplied to the discharge lamp is defined as either positive or negative, which will be hereinafter referred to as polarity fixing period, exceeds a predetermined time, and for then forcibly inverting the polarity of the voltage. A specific circuit example of the polarity inversion means will be described later.

Therefore, if a predetermined time limit is placed on the polarity fixing period, the above-mentioned problem caused by keeping the voltage polarity to the discharge lamp for a time exceeding the limit can be solved, and the alternating operation of the switch elements sw1 and sw2 is enabled after the discharge lamp is lighted after the expiration of the limit time.

The circuit shown in FIG. 1 can be extended to a circuit capable of controlling lighting of two discharge lamps. For example, if the configuration shown in FIG. 3 is used as DC power supply circuit and a DC-AC conversion circuit 4A having a full-bridge type circuit configuration using four semiconductor switch elements is adopted as in a lighting circuit 1A shown in FIG. 6. However, when one of two discharge lamps is already lighted and the other is to be lighted, thermal stress placed on the discharge lamp already lighted introduces a problem.

Figure 6:
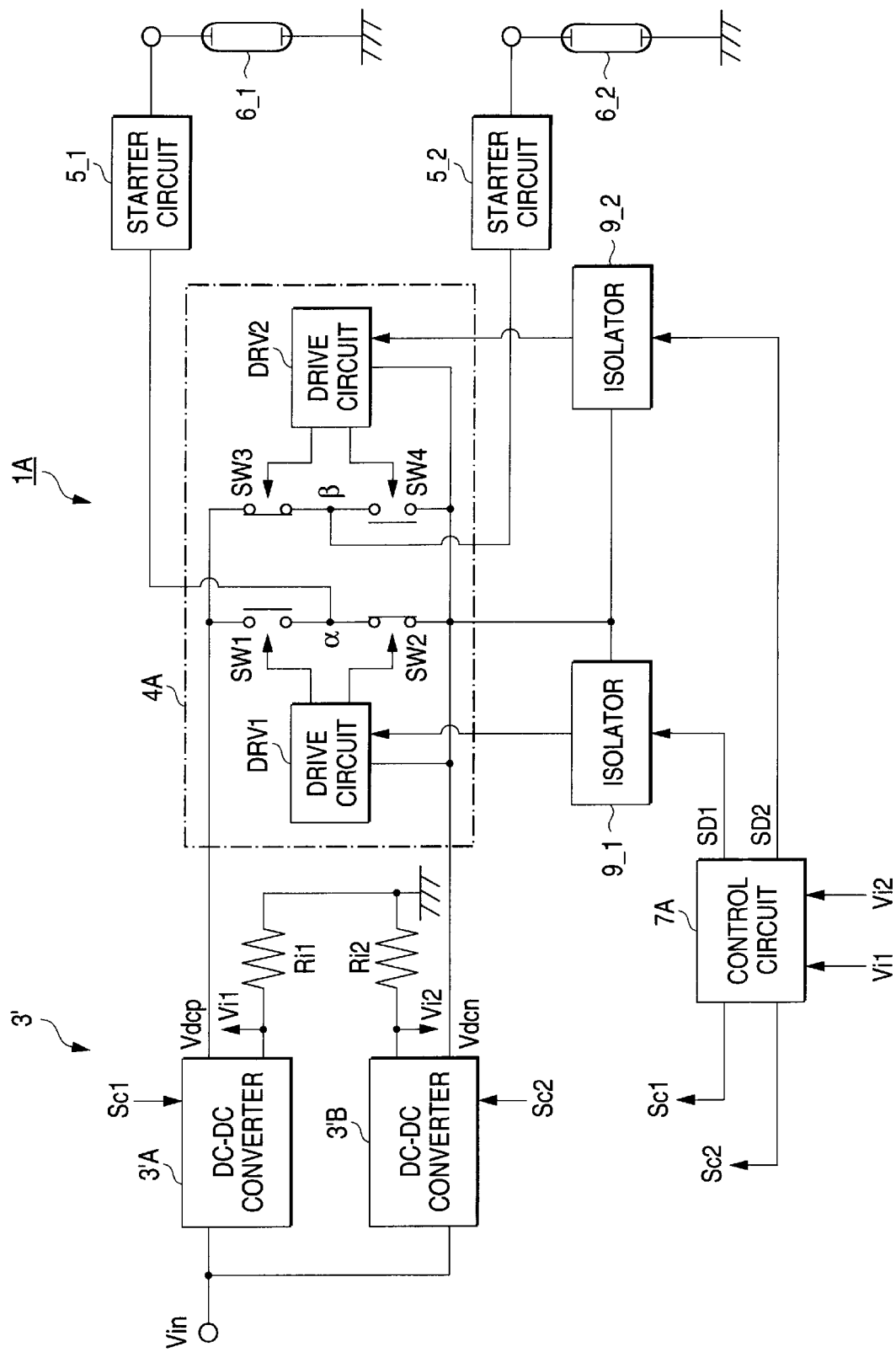
FIG. 6 is a diagram showing a circuit configuration example for lighting two discharge lamps.

In FIG. 6, one of the switch elements sw1 of a first series pair sw1, sw2, is connected at one end to an output terminal of a DC—DC converter 3'A and is connected at an opposite end to an output terminal of a DC—DC converter 3'B via the switch element sw2. A first discharge lamp 6_1 is connected to a connection point α between the switch elements sw1 and sw2 via an inductive load in a starter circuit 5_1.

One of the switch elements sw3 of a second series pair sw3, sw4, is connected at one end to the output terminal of the DC—DC converter 3'A and is connected at an opposite end to the output terminal of the DC—DC converter 3'B via the switch element sw4. A second discharge lamp 6_2 is connected to a connection point β between the switch elements sw3 and sw4 via an inductive load in a starter circuit 5_2.

The electrode terminals of the discharge lamps 6_1 and 6_2 not connected to the connection point α or β are grounded. If the current detection resistors Ri1 and Ri2 are not used, one end of each electrode may be grounded via a detection resistor in place of Ri1 or Ri2.

A half-bridge driver IC is used in drive circuits DRV1 and DRV2, each for receiving a signal from a control circuit (7A) and defining the bridge polarity.

In the DC-AC conversion circuit 4A, one drive circuit DRV1 controls turning on/off the switch elements sw1 and sw2 and the other drive circuit DRV2 controls turning on/off the switch elements sw3 and sw4. That is, assuming that the state of each switch element is defined so that the switch element sw1 is turned on and the switch element sw2 is turned off by the drive circuit DRV1 at one time, the state of each switch element is defined so that the switch element sw3 is turned off and the switch element sw4 is turned on by the drive circuit DRV2 at this time. Assuming that the state of each switch element is defined so that the switch element sw1 is turned off and the switch element sw2 is turned on by the drive circuit DRV1 at another time, the state of each switch element is defined so that the switch element sw3 is turned on and the switch element sw4 is turned off by the drive circuit DRV2 at this time. Thus, the switch elements sw1 and sw4 are switched to the same state, and the switch elements sw2 and sw3 are switched the same state so that they alternately and reciprocally operate.

Therefore, the two pairs of the switch elements are turned on and off, whereby while a positive-polarity voltage is supplied to the first discharge lamp 6_1, for example, a negative-polarity voltage is supplied to the second discharge lamp 6_2 (conversely, while a negative-polarity voltage is supplied to the first discharge lamp 6_1, a positive-polarity voltage is supplied to the second discharge lamp 6_2).

The control signals from the control circuit 7A, SD1 and SD2 (described later in detail), are sent through isolators 9_1 and 9_2 to the drive circuits DRV1 and DRV2. Thus, in the example shown in FIG. 6, a low potential side voltage (ground potential) in each drive circuit is output voltage from the DC—DC converter 3'B for negative-polarity output, and thus isolation becomes necessary for defining H (high) and L (low) levels for the voltage and receiving the control signals (binary signals) and controlling turning the switch elements sw1 to sw4 on and off. Of course, if a bridge driver IC comprising an isolating function is used for each drive circuit, the control signals may be input directly to the drive circuits.

In the lighting circuit 1A, the polarity of the voltage supplied to one of the two discharge lamps is positive, and switching control of the elements sw1 to sw4 is performed so that the polarity of the voltage supplied to the other discharge lamp becomes negative. Therefore, when one discharge lamp is already lighted, if the other discharge lamp is lighted, control during the polarity fixing period mentioned above for this discharge lamp is also performed for the discharge lamp already lighted. Thus, although this discharge lamp is lighted in a stable state, if the voltage polarity is fixed over a long period of time from this state, the load on the electrode (thermal stress) is increased.

In order to solve the problem, the duration of the polarity fixing period is limited so as not to continue to exceed the allowable upper limit value. For example, a circuit configuration example shown in FIG. 7 can be used.

Figure 7:
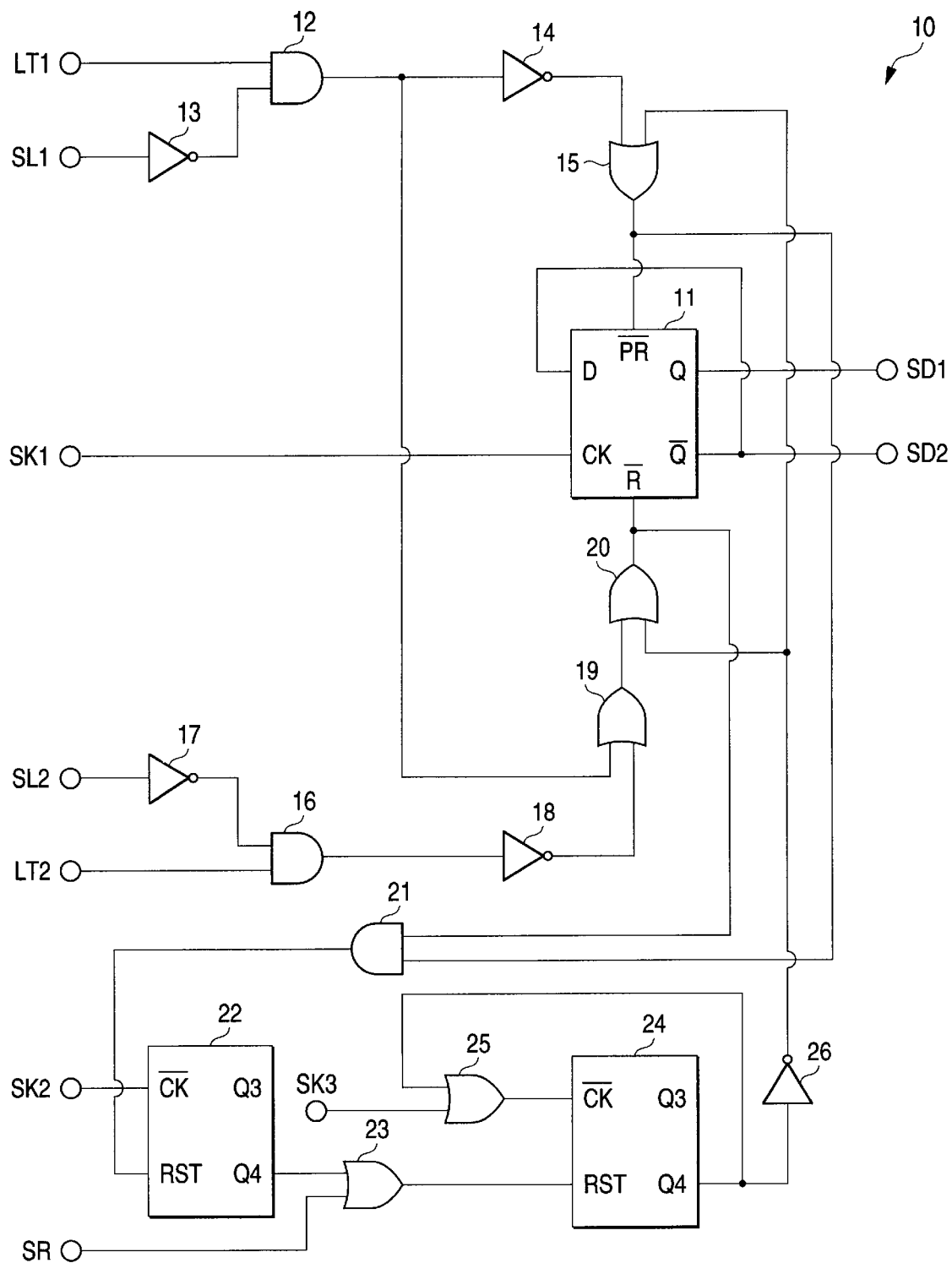
FIG. 7 is a circuit diagram showing a configuration example of the main part of a control circuit.

FIG. 7 shows an implementation 10 of the main part of a generation portion of the control signal sent to the drive circuit (DRV1, DRV2) in the control circuit 7A. The meanings of the signals used in the figure are as follows:

Signal LT1: Signal for instructing discharge lamp 6_1 to be lighted

Signal LT2: Signal for instructing discharge lamp 6_2 to be lighted

Signal SL1: Determination signal as to the lighted/extinguished state of discharge lamp 6_1

Signal SL2: Determination signal as to the lighted/extinguished state of discharge lamp 6_2

Signal SK1: Reference clock signal (for example, a rectangular wave signal of frequency 1 kHz)

Signal SK2: Reference clock signal (for example, a rectangular wave signal of frequency 500 Hz)

Signal SK3: Reference clock signal (for example, a rectangular wave signal of frequency 2 kHz)

Signal SR: Forcible inversion instruction signal (when the signal is high, the voltage polarity to the discharge lamp is inverted temporarily)

When the signal LT1 (LT2) is high, an instruction for lighting the discharge lamp 6_1 (6_2) is given; when the signal LT1 (LT2) is low, an instruction for extinguishing the discharge lamp 6_1 (6_2) is given. When the signal SL1 (SL2) is high, the discharge lamp 6_1 (6_2) is determined to be lighted; when the signal SL1 (SL2) is high, the discharge lamp 6_1 (6_2) is determined to be extinguished. For example, a circuit comprising a comparator can be connected to the stage following the circuit shown in FIG. 5 for comparing the detection current value with a predetermined reference value, thereby determining whether the discharge lamp is lighted or extinguished. In addition, a circuit for detecting the light emission amount of the discharge lamp and comparing the light emission amount with a reference value, to thereby determine whether the discharge lamp is lighted or extinguished, or the like, can be used to determine whether the discharge lamp is lighted or extinguished. However, any configuration may be adopted and therefore such a determining circuit will not be discussed in detail.

The signal SK1 is generated by a clock signal generation circuit (not shown) and then is sent to a clock signal input terminal (CK) of a D flip-flop 11. The D flip-flop 11 comprises a preset terminal of active low input (indicated by a bar symbol on PR), a reset terminal of active low input (indicated by a bar symbol on R) and a D input terminal connected to a Q bar output terminal (indicated by a bar symbol on Q). A Q output signal and a Q bar output signal become control signals SD1 and SD2 which are input to the drive circuits DRV1 and DRV2.

The lighting instruction signal LT1 is supplied to one input terminal of a two-input AND gate 12, and the determination signal SL1 as to the first discharge lamp 6_1 is supplied via a NOT gate 13 to the other input terminal of the two-input AND gate 12.

An output signal of the AND gate 12 is sent via a NOT gate 14 to one input terminal of a two-input OR gate 15. An output signal of a counter (24) described later is supplied via a NOT gate (26) to the other input terminal of the OR gate 15.

An output signal of the OR gate 15 is supplied to the preset terminal of the D flip-flop 11.

The signal LT2 for instructing the discharge lamp 6_2 to be lighted is supplied to one input terminal of a two-input AND gate 16, and the determination signal SL2 as to the second discharge lamp 6_2 is supplied via a NOT gate 17 to the other input terminal of the two-input AND gate 16

An output signal of the AND gate 16 is sent via a NOT gate 18 to one input terminal of a two-input OR gate 19. The output signal of the AND gate 12 is supplied to the other input terminal of the OR gate 19.

An output signal of the OR gate 19 is supplied to one input terminal of a two-input OR gate 20 positioned at the state following the OR gate 19, and the output signal of the counter (24) described later is supplied via the NOT gate (26) to the other input terminal of the OR gate 20.

An output signal of the OR gate 20 is supplied to the reset terminal of the D flip-flop 11.

The output signals of the OR gates 15 and 20 are sent to a two-input AND gate 21 and an output signal of the AND gate 21 is supplied to a reset terminal (RST) of a binary counter 22.

The signal SK2 is supplied from the clock signal generation circuit (not shown) to a clock signal input terminal (indicated by a bar symbol on CK as a terminal of an active low input in the figure) of the counter 22, and a division signal provided through an output terminal Q4 of the counter 22 (when the integer index indicating the stage level is i, Qi denotes the ith-stage output terminal) is sent to one input terminal of a two-input OR gate 23 at the stage following the counter 22.

The forced inversion instruction signal SR given to the components of a full-bridge type circuit (switch elements sw1 to sw4) is supplied to the other input terminal of the two-input OR gate 23, and an output signal of the OR gate 23 is supplied to a reset terminal (RST) of the binary counter (24) at the stage following the OR gate 23. A configuration example of a circuit for generating the forced inversion instruction signal SR will be described later in detail.

The signal SK3 is supplied from the clock signal generation circuit (not shown) via a two-input OR gate 25 to a clock signal input terminal (indicated by a bar symbol on CK as a terminal of active low input in the figure) of the counter 24, and a signal from an output terminal Q4 of the counter 24 is supplied to the other input terminal of the OR gate 25. The signal output from the output terminal Q4 is supplied via a NOT gate 26 to the input terminals of the OR gates 15 and 20.

Figure 8:
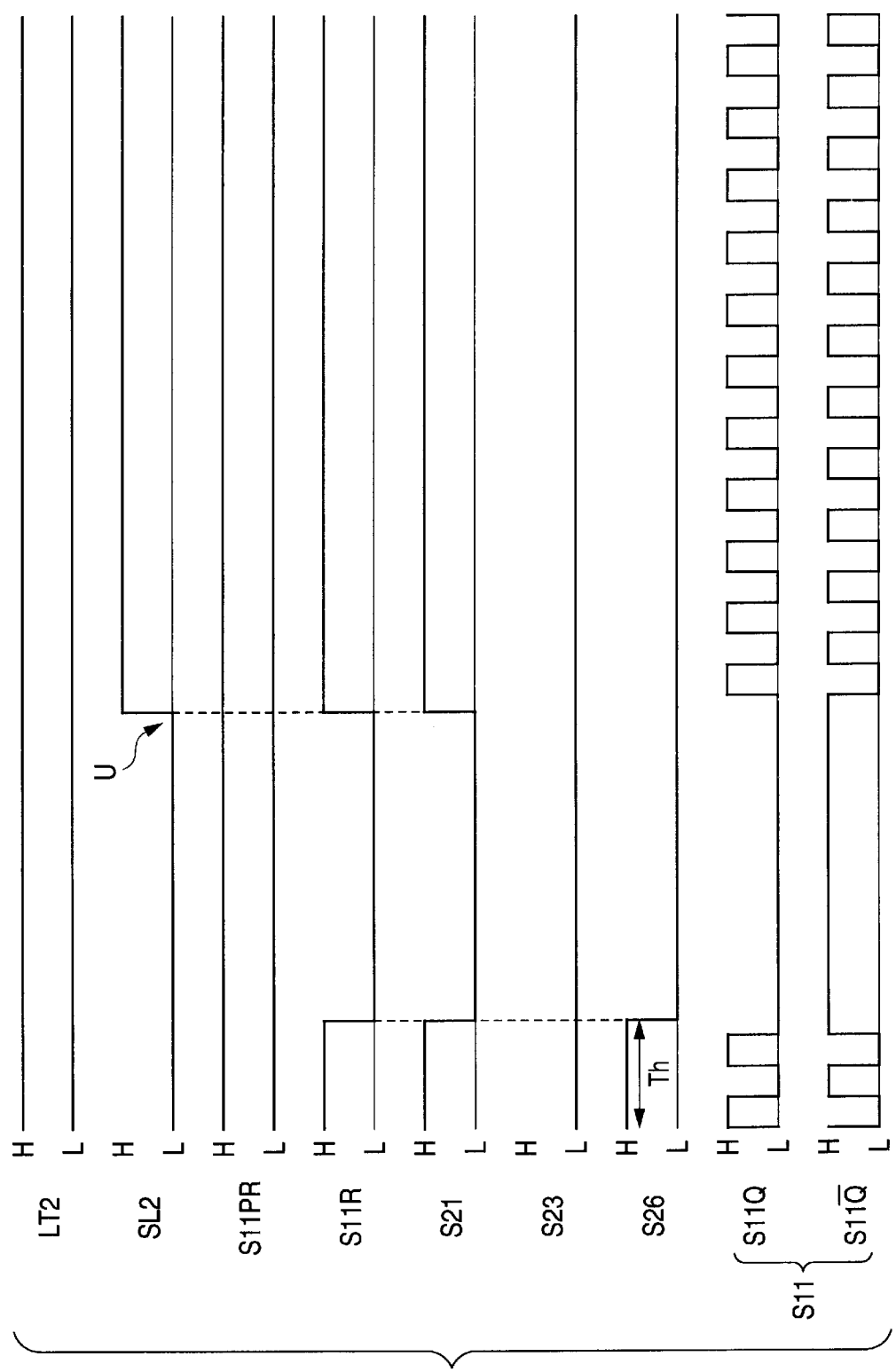
FIG. 8 is a timing chart illustrating the operation of the circuit shown in FIG. 7 together with FIG. 9; it shows a state in which a discharge lamp is lighted normally.
Figure 9:
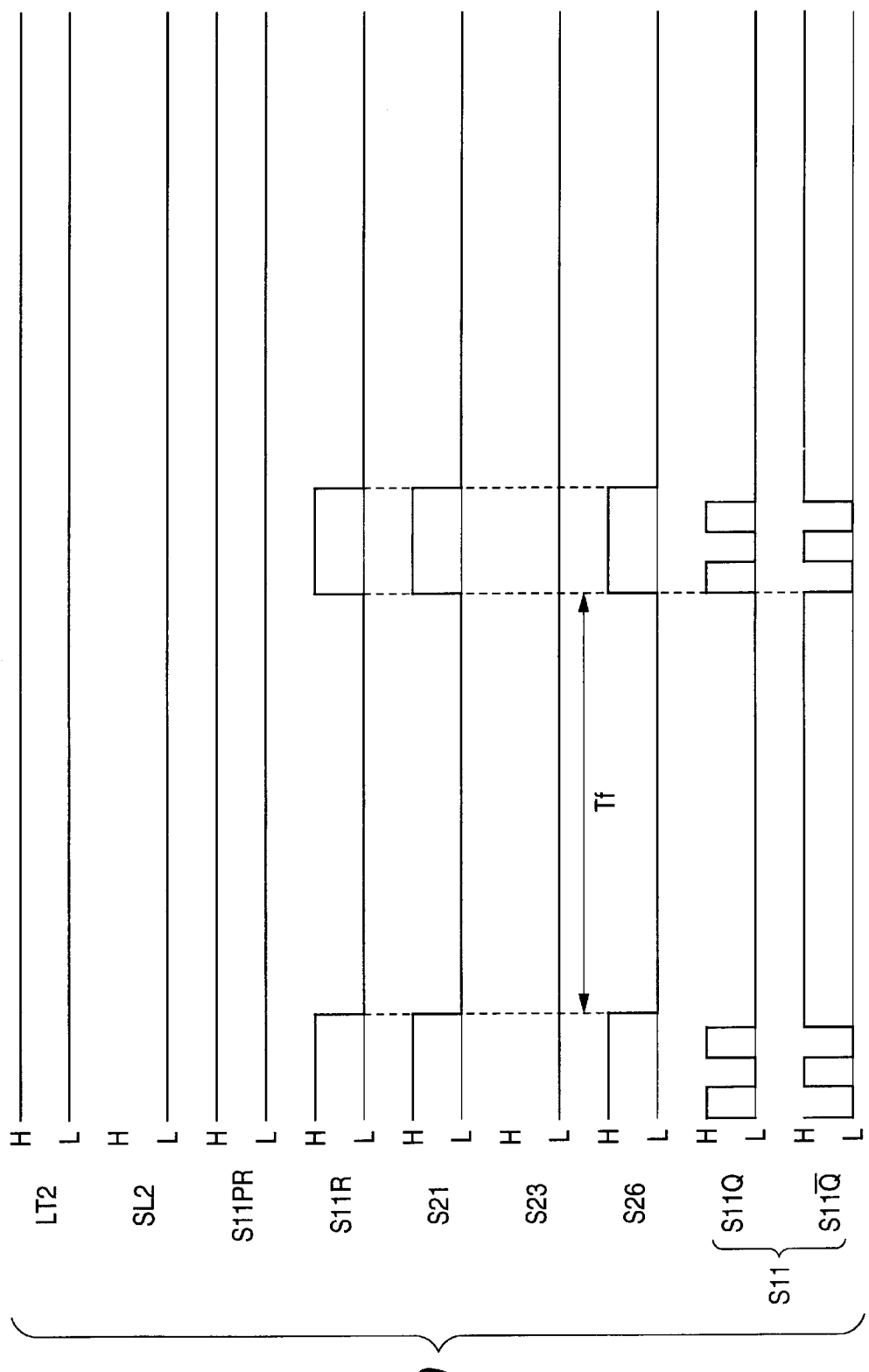
FIG. 9 is a timing chart illustrating the circuit operation when the discharge lamp is not lighted after the expiration of a predetermined time.

FIGS. 8 and 9 are timing diagrams indicating the signals required for describing the operation of the circuit. The description to follow assumes that one of the two discharge lamps, 6_1, is already lighted and the other discharge lamp 6_2 is to be lighted. In FIGS. 8 and 9, the meanings of the signals are as follows:

S11PR: Input signal to preset terminal of D flip-flop 11

S11R: Input signal to reset terminal of D flip-flop 11

S21: Output signal of AND gate 21

S23: Output signal of OR gate 23

S26: Output signal of NOT gate 26

S11: Output signal of D flip-flop 11 (the Q denotes Q output signal and the signal indicated by bar on Q is Q bar output signal).

The signals LT2 and SL2 are as previously described and in the figures, H means high and L means low.

FIG. 8 describes the circuit operation in the period of time that includes the point in time before the discharge lamp 6_2 is lighted and the point in time after the discharge lamp is lighted normally.

Before the discharge lamp 6_2 is lighted, an instruction to light the discharge lamp 6_2 is output and thus the signal LT2 is high and since the discharge lamp 6_2 is extinguished, the signal SL2 is low. Thus, the AND gate 16 outputs a high signal and the high signal is passed through the NOT gate 18, whereby the signal is inverted and sent to the OR gate 19. Since the discharge lamp 6_1 is lighted as mentioned above, both the signals LT1 and SL1 are high and thus the AND gate 12 outputs a low signal and the low signal is passed through the NOT gate 14, whereby the signal is inverted and supplied sent via the OR gate 15 to the preset terminal of the D flip-flop 11. The flip-flop 11 is not reset while the output signal of the OR gate 19 is low and the signal S26 supplied from the counter 24 through the NOT gate 26 and the OR gate 20 to the reset terminal of the D flip-flop 11 is high (see Th in FIG. 8). Thus, alternating outputs (dividing signals of signal SK1 by two) are provided at the Q output terminal and the Q bar output terminal of the D flip-flop 11. When the period Th is finished, the signal S26 goes low, resetting the D flip-flop 11.

The signals S11PR and S11R are ANDed and the output signal S21 is low until the discharge lamp 6_2 is lighted (the point in time at which the discharge lamp 6_2 is lighted is indicated by the arrow U in FIG. 8).

The time count operation of the counter 22 is started at the instant at which the signal S21 makes a high-to-low transition. Since the signal S23 is low while the Q4 output of the counter 22 is low (in the example, for 16 milliseconds), the counter 24 at the stage following the counter 22 is not reset provided that the signal SR is low.

The signal S23 goes low and while Q4 output is low, the time count operation of the counter 24 is performed based on the signal SK3. When a predetermined time (in the example, four milliseconds) has elapsed, the Q4 output goes high and thus the signal SK3 is not accepted.

The signal S26 is supplied through the OR gate 20 to the reset terminal of the D flip-flop 11 as a low signal and the D flip-flop 11 is reset. This state continues to the point in time at which the discharge lamp 6_2 is lighted.

When the discharge lamp 6_2 is lighted, the signal SL2 goes high and thus the output signal of the AND gate 16 makes a high-to-low transition. The low signal is passed through the NOT gate 18, whereby the signal is inverted high and supplied through the OR gates 19 and 20 to the reset terminal of the D flip-flop 11, so that the reset condition of the D flip-flop 11 is released.

At the point in time at which the discharge lamp 6_2 is lighted, the signal S21 makes a low-to-high transition and the high signal is supplied to the reset terminal of the counter 22, resetting the counter 22. Since the signal S23 is low, the counter 24 is in a state in which it counts up, and the Q4 output of the counter 24 is input to the NOT gate 26, which then outputs the signal S26 low.

As the reset condition of the D flip-flop 11 is released, divided signals of the signal SK1 are provided through the Q output terminal and the Q bar output terminal of the D flip-flop 11 and are sent to the drive circuits DRV1 and DRV2 as the signals SD1 and SD2.

FIG. 9 illustrates the circuit operation in the situation in which the discharge lamp 6_2 is not lighted although a predetermined time has elapsed since the point in time before lighting the discharge lamp 6_2.

In this case, the discharge lamp 6_2 is not lighted after the expiration of the period (Tf in FIG. 9) between the instant at which the signals S11R, S21, and S26 each make a high-to-low transition and the instant at which a stipulated time has elapsed. Thus, the signal LT2 continues high and the signal SL2 remains low.

Therefore, the Q4 output of the counter 22 goes high and the counter 24 at the following stage is reset. When the signal S26 goes high, the signals S11R and S21 each make a low-to-high transition, whereby the counter 24 is also reset. Consequently, a high signal having a narrow pulse width is provided as the signal S23.

When the signal S23 makes a high-to-low transition, the reset condition of the counter 24 is released, and the signals S11R, S21, and S26 go high until the Q4 output of the counter 24 goes high. Thus, alternating outputs provided through the Q output terminal and the Q bar output terminal of the D flip-flop 11 are sent to the drive circuits DRV1 and DRV2.

Then, when the signals S11R, S21, and S26 go low again, the D flip-flop 11 is reset.

In the example, for simplicity, the stipulated-frequency voltage is supplied to the discharge lamp just after the discharge lamp is lighted. Instead, however, a method of providing a period of temporarily supplying low-frequency voltage (so-called DC lighting period) or a method of gradually shifting the frequency to a stipulated frequency while the frequency is raised is adopted, whereby the lighting performance of the discharge lamp can be enhanced.

The discharge lamp making the transition from a lighted state to an extinguished state is detected and at the time, the polarity of the voltage supplied to the discharge lamp is inverted. The reason for doing so is that, for example, when a period of DC lighting just after the discharge lamp is lighted is provided and if the discharge lamp is extinguished in the first half of the period, the polarity before the discharge lamp is lighted remains fixed and thus there is a concern that the polarity may not be inverted forever.

Figure 10:
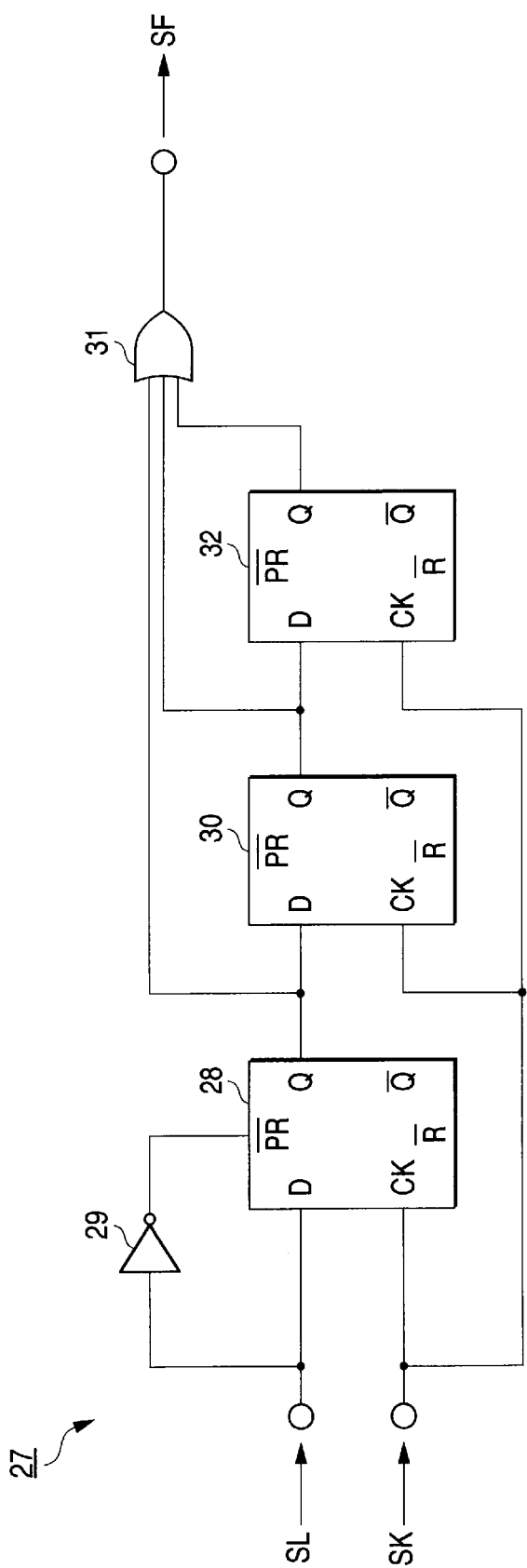
FIG. 10 is a circuit diagram showing a circuit example for providing a signal SF with detection sensitivity intentionally degraded based on a determination signal SL as to the lighted/extinguished state of a discharge lamp.
Figure 12:
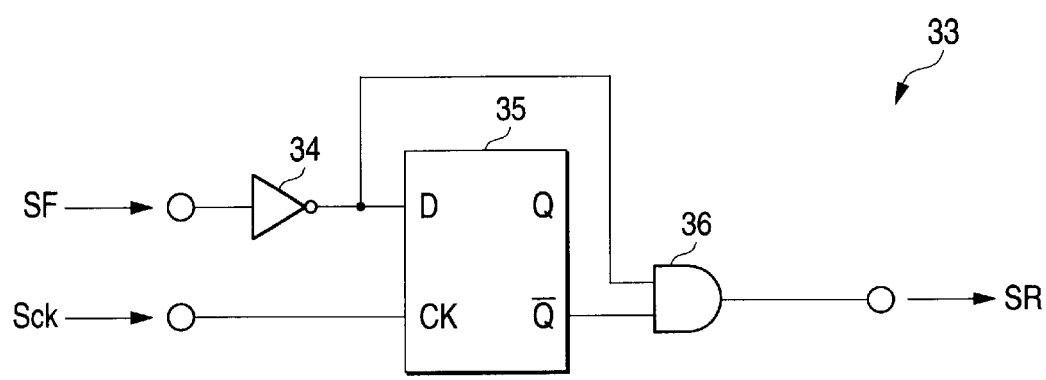
FIG. 12 is a circuit diagram showing an example of a generation circuit of a forcible inversion instruction signal SR.

To avoid such a problem, for example, output signals provided from circuit examples shown in FIGS. 10 and 12 may be used as a forced inversion instruction signal SR.

The signals will be discussed below before the circuit configurations.

Figure 11:
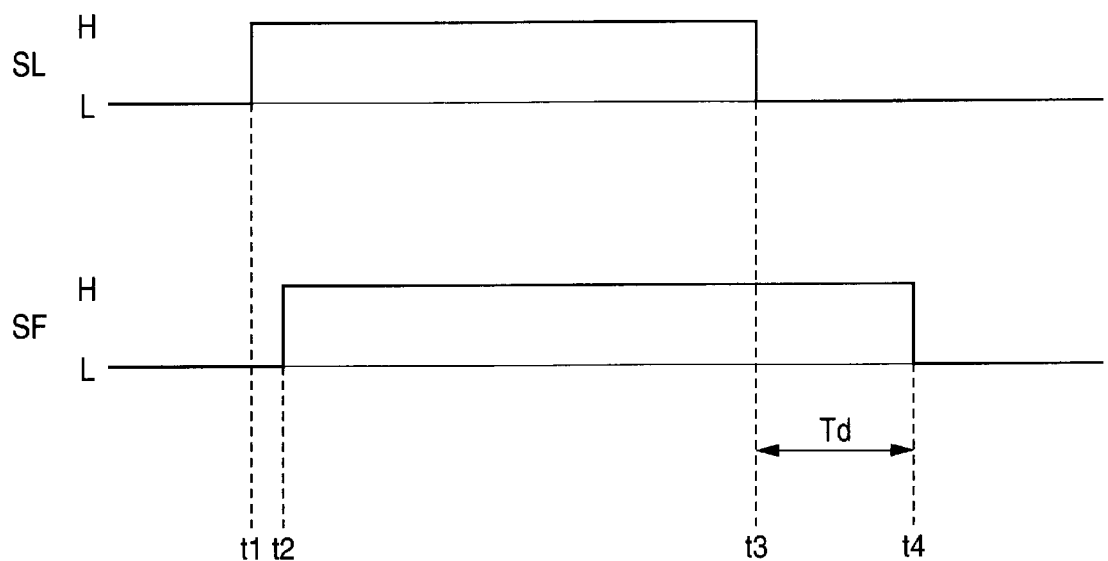
FIG. 11 is a timing chart showing the signals SL and SF in FIG. 10.

FIG. 11 shows a lighted/extinguished state determination signal of a discharge lamp, SL, and a signal SF generated based on the SL signal.

Both the signals are common in that when each signal is high, it indicates the lighted state of the discharge lamp; when each signal is low, it indicates the extinguished state of the discharge lamp. However, the signal SL makes a low-to-high transition at time t1 and the signal SF makes a low-to-high transition at time t2 slightly delayed from the time t1 and both the signals also differ in the duration that they remain high. The signal SF has a signal width longer than the signal SL has by period Td in FIG. 11 (time interval between the falling edge of the signal SL, t3, and t4) to intentionally degrade the detection sensitivity to the transition from the lighted state of the discharge lamp to the extinguished state. For example, when the current flowing into the discharge lamp may lower instantaneously due to a malfunction, or due to a too sensitive response control or the like, which may be caused by frequent occurrence of a transient determination signal, and then the discharge lamp may be determined to be extinguished which introduces a problem, and thus such a state needs to be avoided. The signal SF is insensitive to such occurrences as compared with the signal SL.

FIG. 10 shows a circuit example 27 for generating the signal SF. Three D flip-flops each comprising a preset terminal having an active low input and a reset terminal having an active low input are cascaded, and Q output signals of the flip-flops are ORed together.

That is, the signal SL is supplied to a D input terminal of the D flip-flop 28 at the first stage and is also supplied through a NOT gate 29 to the preset terminal (indicated by a bar symbol on PR). A clock signal (SK) is input from a signal generation circuit (not shown) to a clock signal input terminal (CK) of the D flip-flop 28.

The Q output signal of the D flip-flop 28 is sent to a D input terminal of the D flip-flop 30 at the following stage and is also sent to a three-input OR gate 31.

The clock signal SK is supplied to a clock signal input terminal (CK) of the D flip-flop 30 and the Q output signal of the D flip-flop 30 is sent to a D input terminal of the D flip-flop 32 at the last stage and is also sent to the three-input OR gate 31.

The clock signal SK is also supplied to a clock signal input terminal (CK) of the D flip-flop 32 and the Q output signal of the D flip-flop 32 is sent to the three-input OR gate 31.

In the circuit 27, the D flip-flop 28 at the first stage is preset by the inversion signal of the signal SL and thus meanwhile the Q output which goes high is provided and becomes a delayed signal in sequence in synchronization with the rising edge of the signal SK by the D flip-flops 30 and 32 at the following and last stages, and the Q output signals of the D flip-flops 28, 30, and 32 are ORed together through the three-input OR gate 31 to provide the signal SF. Consequently, the delay time Td is added to the signal SL as shown in FIG. 11.

FIG. 12 shows a circuit configuration example 33 for a generation circuit section to generate a forced inversion instruction signal SR.

The signal SF is supplied through a NOT gate 34 to a D input terminal of a D flip-flop 35 and is also supplied to one input terminal of a two-input AND gate 36. A clock signal (Sck) is input from a signal generation circuit (not shown) to a clock signal input terminal (CK) of the D flip-flop 35. A Q bar output signal of the D flip-flop 35 is supplied to the other input terminal of the AND gate 36.

An output signal of the AND gate 36 becomes the above-described signal SR, which then is sent to the OR gate 23 in FIG. 7. That is, while the signal is high, the counter 24 is reset and thus the signal S26 goes high and the inversion operation of the D flip-flop 11 is performed with a frequency of 500 Hz for a predetermined time (four milliseconds).

In the operation of the circuit, the inversion signal of the signal SF is used as the D input signal of the D flip-flop 35 and thus the Q bar output signal makes a low-to-high transition in synchronization with the rising edge of the first clock signal Sck after the falling edge of the inversion signal of the signal SF (D input signal), and the Q bar output signal makes a high-to-low transition in synchronization with the rising edge of the first clock signal Sck after the rising edge of the inversion signal of the signal SF. Therefore, the signal SF resulting from ANDing the Q bar output signal with the inversion signal of the signal SF is a pulse signal which goes high in synchronization with the falling edge of the signal SF, and then makes a high-to-low transition in synchronization with the falling edge of the Q bar output signal.

Figure 13:
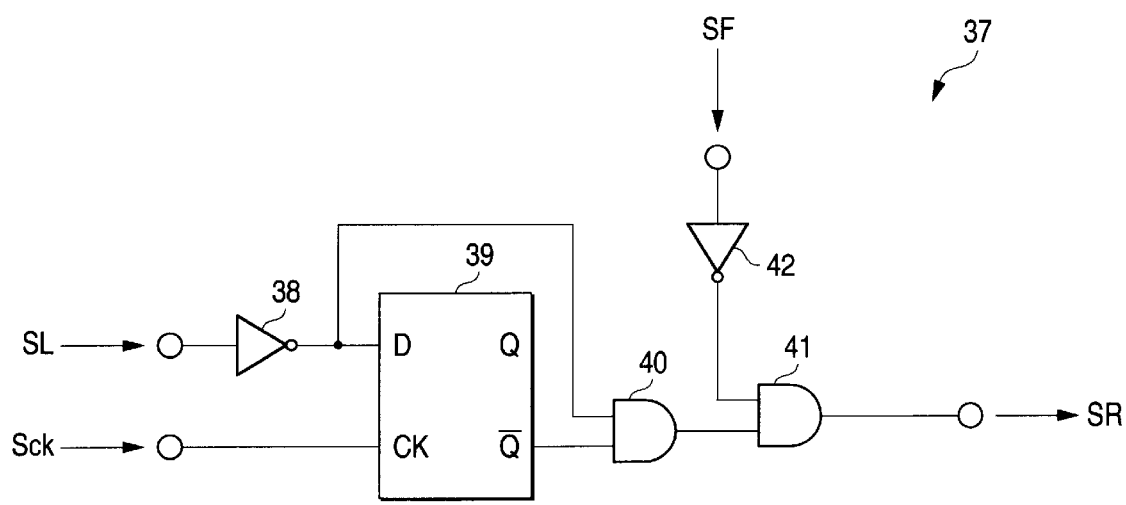
FIG. 13 is a circuit diagram showing another example of a generation circuit of a forcible inversion instruction signal SR.

In addition, an alternate configuration example 37 as shown in FIG. 13 can be used as a circuit for generating the forced inversion instruction signal SR by using both the signals SL and SF, if the discharge lamp does not make the transition to a stable lighted state after breakdown.

The differences between the configuration example 37 and the configuration previously described with reference to FIG. 12 are as follows:

An input signal to a NOT gate 38 is not the signal SF but is the lighted/extinguished state determination signal SL as to the discharge lamp, and an output signal of the NOT gate 38 is supplied to a D input terminal of a D flip-flop 39.

An AND gate 40 to which a Q bar output signal of the D flip-flop 39 and the output signal of the NOT gate 38 are input is followed by another two-input AND gate 41. An output signal of the AND gate 40 is supplied to one input terminal of the AND gate 41 and the signal SF is supplied through a NOT gate 42 to the other input terminal of the AND gate 41*m* and an output signal of the AND gate 41 becomes the forced inversion instruction signal SR.

The circuit operates so that the signal SR is not generated when the discharge lamp is lighted for such a short time that the signal SF does not respond. That is, the signal SF has a lighted/extinguished state detection sensitivity of the discharge lamp that is less than the signal SL as mentioned above. Thus, for example, at the breakdown time or the like, the discharge lamp, a situation occurs in which the signal SF remains low if the signal SL becomes a high pulse signal with a short width. In this case, the high signal SL of the narrow width is inverted and supplied to the D input terminal of the D flip-flop 39 and the clock signal Sck is supplied to the clock signal input terminal of the D flip-flop 39. Thus, a high signal of a narrow width is provided at the Q bar output terminal of the D flip-flop 39 in synchronization with the leading edge of the clock signal Sck, and the ANDing output of the ANDing result of the high signal and the NOT signal of the signal SL and the inversion signal (high) of the signal SF becomes a pulse signal, which is sent to the OR gate 23 in FIG. 7. Therefore, while the signal is high, the counter 24 is reset and thus the signal S26 goes high and the inversion operation of the D flip-flop 11 is performed with a frequency of 500 Hz for a predetermined time (four milliseconds).

In the circuit configuration shown in FIG. 7, the supply voltage polarity to the discharge lamp is directly determined by each output of the D flip-flop 11; when a low signal is supplied to the preset terminal of the D flip-flop 11 through the logical gates 12 to 15 concerning the first discharge lamp 6_1, the Q output signal of the D flip-flop 11 is forcibly set high. When a low signal is supplied to the reset terminal of the D flip-flop 11 through the logical gates 16 to 20 concerning the second discharge lamp 6_2, the Q output signal of the D flip-flop 11 is forcibly set low, so that the circuit elements make up polarity definition means.

The D flop-flop 11 performs the inversion operation in response to the signal SK1 when a high signal is supplied to the preset terminal and the reset terminal. That is, an instantaneous pulse signal when the Q4 output signal of the counter 22 of the time count means goes high or the pulse signal SR from the circuit (33 or 37) shown in FIG. 12 or 13 is sent through the OR gate 23 to the counter 24, thereby resetting the counter 24. Thus, the NOT signal of the Q4 output signal goes high and is supplied through the OR gates 15 and 16 to the preset terminal and the reset terminal of the D flip-flop 11. Consequently, the inversion operation of the D flip-flop 11 is enabled during the period determined by the setup time of the counter 24. That is, the circuit elements (21 to 26) make up a polarity inversion means.

The continuation time of the period over which the supply voltage polarity to the discharge lamp is fixed is limited so as not to exceed the stipulated time. Thus, for example, a time limit is also placed on the time of maintaining the switch elements on in a bootstrap type circuit as shown in FIG. 4, so that the need for increasing the capacitance of each capacitor is eliminated.

In the lighting circuit for two discharge lamps, if one discharge lamp is already lighted, when the other discharge lamp is lighted, a time limit is also placed on the polarity fixing period of the voltage supplied to the discharge lamp already lighted, and the polarity is forcibly inverted, so that an excessive thermal stress can be prevented from being placed on the electrode of the discharge lamp.

As seen from the description made above, the supply voltage polarity to the discharge lamp is fixed to one polarity before the discharge lamp is lighted, whereby good lighting of the discharge lamp can be made. The polarity inversion means forcibly inverts the voltage polarity so that the time of fixing the supply voltage polarity to one polarity does not continue more than necessary, which insures that the thermal stress placed on the electrode of the discharge lamp can be decreased to prevent short life and degradation of the discharge lamp, and the costs of the circuit required for maintaining the fixed polarity can be reduced.

According to another implementation, to light a plurality of discharge lamps by a common lighting circuit, a time limit is placed on the duration for temporarily fixing the supply voltage polarity to a discharge lamp before the discharge lamp is lighted. In order to light another discharge lamp with one discharge lamp already lighted, the fixed polarity state of the discharge lamp already lighted is not continued over a time longer than necessary, so that an excessive thermal stress is not placed on the discharge lamp electrode.

If the discharge lamp makes a transition from a lighted state to an extinguished state, the polarity of the voltage supplied to the discharge lamp is inverted, in order to avoid permanent continuation of the fixed polarity state.

Although several implementations of the invention have been described, such implementations are merely illustrative and are not restrictive of the invention. Consequently, other implementations are also within the scope of the following claims.

What is claimed is:

1. A discharge lamp lighting circuit comprising:

a DC power supply circuit for outputting a DC voltage; and a DC-AC conversion circuit for converting the output voltage of said DC power supply circuit into an AC voltage and then supplying the AC voltage to a discharge lamp, wherein to light the discharge lamp, a period of time over which the polarity of the voltage supplied from said DC-AC conversion circuit to the discharge lamp is defined as either positive or negative is provided before the discharge lamp is lighted; and a polarity inversion means for inverting the polarity of the voltage if the duration of the period exceeds a predetermined limit, is provided for alternating the polarity of the voltage supplied to the discharge lamp after the discharge lamp is lighted.

2. A discharge lamp lighting circuit comprising:

a DC power supply circuit for outputting DC voltages, and a DC-AC conversion circuit for converting the output voltages of said DC power supply circuit into AC voltages and then supplying the AC voltages to a plurality of discharge lamps, wherein:

(a) positive-polarity and negative-polarity voltages are output separately from two output terminals of said DC power supply circuit and are sent to said DC-AC conversion circuit, (b) two pairs of switch elements are included in said DC-AC conversion circuit for switching the output voltages of said DC power supply circuit and are in a full bridge circuit configuration, and the AC voltages generated by an alternating operation of the switch elements are supplied to the discharge lamps, (c) in order to light one of the plurality of discharge lamps, the polarity of the voltage supplied from the DC-AC conversion circuit to the discharge lamp is defined as either positive or negative before the discharge lamp is lighted, and the alternating operation of the switch elements is performed after the discharge lamp is lighted, and (d) polarity inversion means is provided to invert the polarity of the voltage if the duration of the period over which the polarity of the voltage supplied to the discharge lamp is defined as either positive or negative exceeds a predetermined time.

3. The discharge lamp lighting circuit as claimed in claim 1 wherein if the discharge lamp makes a transition from a lighted state to an extinguished state, the polarity of the voltage supplied to the discharge lamp is inverted.

4. The discharge lamp lighting circuit as claimed in claim 2 wherein if the discharge lamp makes a transition from a lighted state to an extinguished state, the polarity of the voltage supplied to the discharge lamp is inverted.

5. A method for operating a discharge lamp lighting circuit comprising:

generating an AC voltage from a DC power supply;

defining a period of time over which the polarity of the AC voltage is positive or negative;

lighting the discharge lamp utilizing the AC voltage; and inverting the polarity of the AC voltage if the duration of the period of time exceeds a predetermined limit.

6. The discharge lamp lighting circuit as claimed in claim 3, wherein a polarity inversion means generates a delayed signal whose at least one of leading edge and trailing edge is delayed, based on a determination signal representing a lighted/extinguished state of the discharge lamp; and the polarity of the voltage applied to the discharge lamp is inverted according to the signal.

7. The discharge lamp lighting circuit as claimed in claim 3, wherein a polarity inversion means generates a determination signal representing a lighted/extinguished state of the discharge lamp, and a delayed signal whose at least one of leading edge and trailing edge is delayed from the determination signal; and the polarity of the voltage applied to the discharge lamp is inverted according to the determination signal and the delayed signal.

* * * * *